United States Patent [19]

Raszewski

[11] Patent Number: 5,156,910

[45] Date of Patent: Oct. 20, 1992

[54] CUSHIONY PACKAGING

[75] Inventor: Lewis R. Raszewski, Stevensville, Md.

[73] Assignee: The Crowell Corp., Newport, Del.

[21] Appl. No.: 565,130

[22] Filed: Aug. 10, 1990

Related U.S. Application Data

[63] Continuation-in-part of Ser. No. 82,794, Aug. 6, 1987, Pat. No. 4,950,523, and a continuation-in-part of Ser. No. 783,430, Oct. 4, 1985, Pat. No. 4,693,056, and a continuation-in-part of Ser. No. 873,819, Jun. 13, 1986, abandoned, and a continuation-in-part of Ser. No. 940,566, Dec. 12, 1986, Pat. No. 4,698,254, and a continuation-in-part of Ser. No. 142,075, Jan. 11, 1988, abandoned.

[51] Int. Cl.⁵ .................................................. B32B 7/00
[52] U.S. Cl. ...................................... 428/343; 428/40; 428/352; 428/354
[58] Field of Search ................... 428/40, 343, 352, 354

[56] References Cited

U.S. PATENT DOCUMENTS

| | | | |
|---|---|---|---|
| 4,584,225 | 4/1986 | Adelman | 428/354 |
| 4,726,977 | 2/1988 | Goldstein et al. | 428/906 |

Primary Examiner—William J. Van Balen
Attorney, Agent, or Firm—Connolly & Hutz

[57] ABSTRACT

A paper sealing tape in which the paper is from about 40 to about 90 pound weight, one face of the paper has a slip coating, and the other face carries a layer of pressure-sensitive cement in which is embedded reinforcing fibers to give the tape a breaking strength about 100 or more pounds per two inch width.

2 Claims, 2 Drawing Sheets

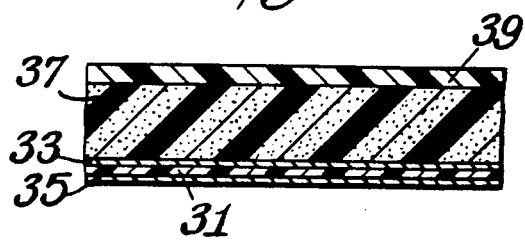
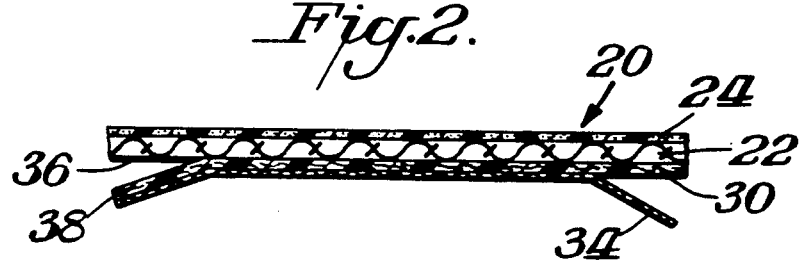
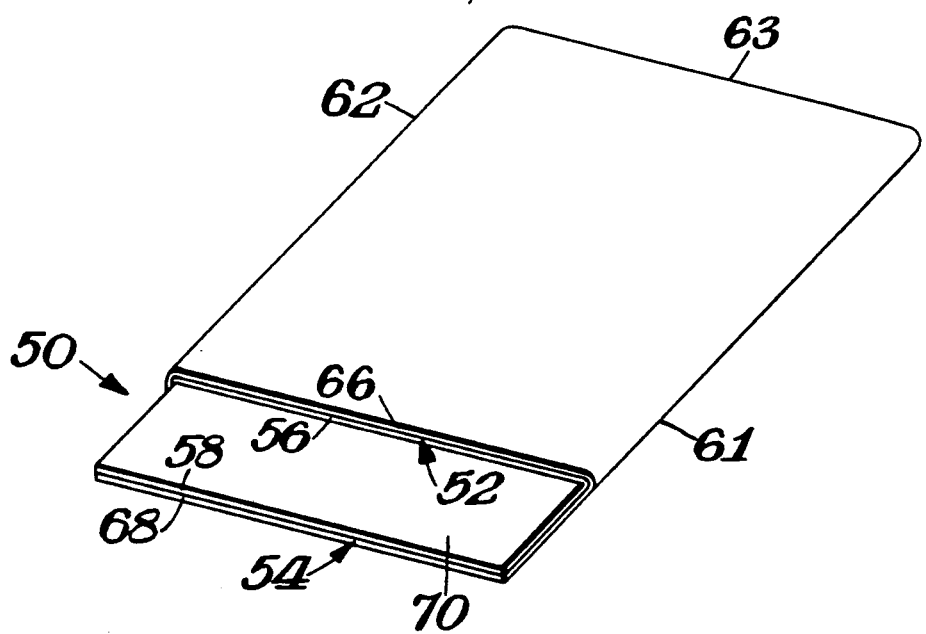

CUSHIONY PACKAGING

The present application is in part a continuation of Ser. No. 82,794 filed Aug. 6, 1987, which in turn is a continuation-in part of Serial Nos.

Ser. No. 783,430 filed Oct. 4, 1985 (U.S. Pat. No. 4,693,056)

Ser. No. 873,819 filed Jun. 13, 1986 (subsequently abandoned)

Ser. No. 940,566 filed Dec. 12, 1986 (U.S. Pat. No. 4,698,254) and

Ser. No. 142,075 filed Jan. 11, 1988 (now abandoned).

The present invention relates to wrapping and packaging materials.

Among the objects of the present invention is the provision of improved articles useful for packaging and wrapping.

The foregoing as well as still further objects of the present invention will be more fully understood from the following description of several of its embodiments, reference being made to the accompanying drawings, in which:

FIG. 1 is a sectional view of a packaging laminate according to the present invention;

FIGS. 2 and 3 are sectional views of sealing tapes that can be used to seal packages pursuant to the present invention; and FIGS. 4, 5 and 6 are isometric views of packaging envelopes representative of the present invention.

Figure 5:
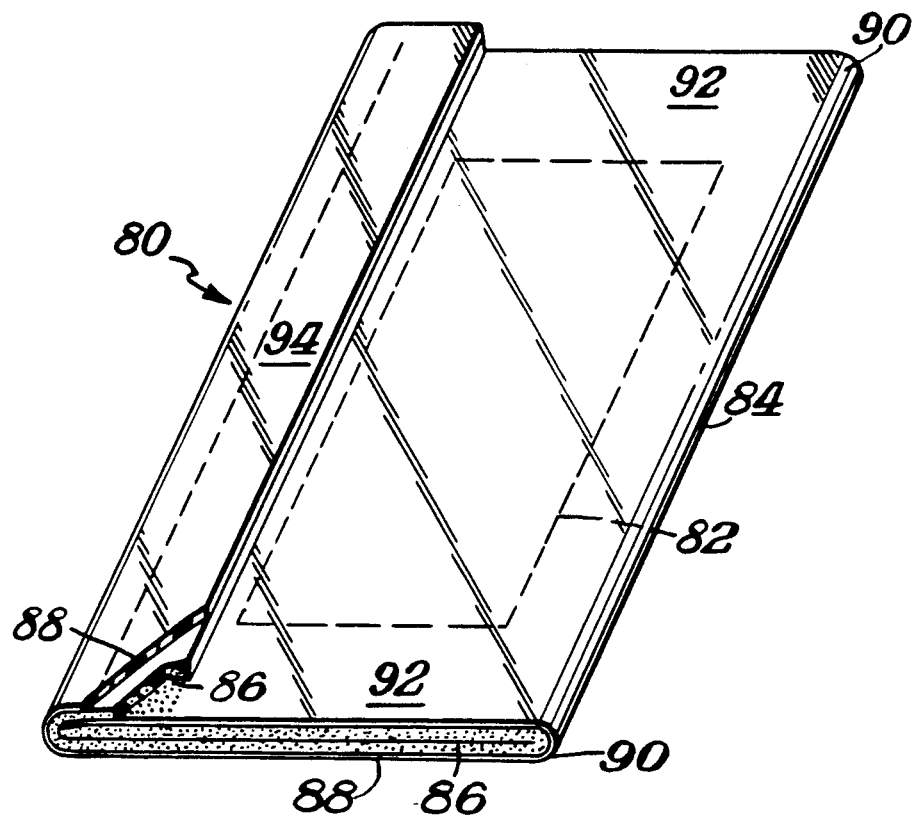

Where articles are to be packaged in foam-lined wrappers, as in the parent applications, corrugated paperboard and open-faced corrugated paperboard make very effective supports for the foam. The open-faced material is particularly desirable, as shown in application Ser. No. 938,600 filed Dec. 5, 1986 and subsequently abandoned, inasmuch as the open-face construction makes it possible to feed that material from a coiled-up roll. The foam can be applied to the open face or to the closed face of the open-face board.

A sandwich of cross-tensilized polyethylene films with an overall thickness of up to about 1/5 millimeter also makes a very good foam support. Where the foam is applied in stripes of thermoplastic resin, two stripe-carrying sheets of paper, or portions of one such sheet, can be heat sealed together quite readily and effectively foam-to-foam. Such heat sealing is also effective when the foam stripes carry or are coated with an antistat agent or a volatile corrosion inhibitor, or both, also as described in the parent applications.

The stripe-carrying sheets can also be adhered to each other without heating, by use of top coatings of cohesive-nonadhesive cements as described in the parent applications, or of pressure-sensitive cements. The cushiony character of the foam stripes permits the stripes to be compressed somewhat to obtain greater contact between the sheet portions to be thus cemented together. However, the simple application of a cohesive-nonadhesive top coating will cause more of such coating to build up between foam stripes as compared to on top of foam stripes, and this further improves the cementing.

The following foam-forming formulations are suitable for use in applying the stripes and in applying continuous foam coatings:

EXAMPLE 1

| | |
|---|---|
| Natural rubber latex (62% solids) | 100 g. |
| Ammonium stearate (33% in water) | 2 g. |
| Acrylic thickener | 3.5 g. |
| Commercial curing mixture | 13 g. |

One effective curing mixture is a mixture of, by weight:

| | |
|---|---|
| Powdered sulfur | 1.65 parts |
| Powdered zinc oxide | 1.25 parts |
| Zinc diethyl dithiocarbamate | 1.00 part |
| Zinc-2-mercapto-benzothiazole | 1.25 parts |
| Phenolic antioxidant | 0.75 part |

The ingredients are carefully added to the latex to keep from destabilizing it, and the entire mixture stirred slowly at first for the same reason. When the mixing is complete, the mixture is then foamed by beating air into it with a household beater. This takes several minutes to provide a low-density microfoam that has an expansion of about 3 and shows very little flow, but is readily spreadable. Transferring it to a feed trough and moving a support sheet of 30-pound Kraft paper through at about 30 centimeters per second with slots about one centimeter wide and about three millimeters deep, followed by baking at about 170° C. for about one minute, produces a very desirable cushiony product. The cured foam stripes in this product are about one millimeter wider than the slots. The same results are obtained with a hand-held spreader bar which is pushed through a layer of the microfoam, without the help of the foregoing apparatus.

Synthetic SBR rubber latex can be substituted for the natural rubber latex, and the antioxidant can be omitted if the cushioned sheets are to be used right away. The thickener can also be omitted, in which event the liquid content of the microfoam is preferably reduced as by use of more concentrated latex and additives, and by subjecting the uncured microfoam to curing heat before or as it is pushed through the spreader slots. The resulting cured product may have its foam stripes about 2 to 4 millimeters wider than the slots.

Other thickeners, such as cellulose ethers, can be used in place of or in addition to some or all of the acrylic thickeners.

Other resins such as polyvinyl chloride or polystyrene or polyurethanes can be used in place of or in addition to the rubber in the latex. Foaming can be effected by incorporating a gas-generating foaming agent in with the resin, rather than or in combination with the beating action. This is shown in U.S. Pat. No. 4,636,425 as well as in the following example:

EXAMPLE 2

A polyethylene foam mixture is prepared according to Japanese Patent Application No. 41-23660, published Aug. 22, 1970 under Number 45-25398. This mixture consists of, by weight:

| | |
|---|---|
| Polyethylene powder | 400 parts |
| Sodium silicate ($Na_2SiO_3$) | 31 parts |
| Silica gel ($SiO_2$) | 51 parts |
| Water | 18 parts |

| | |
|---|---|
| Hydrated alumina | 5 parts |

-continued

This mixture is heated to about 150° C. to melt the polyethylene and foam it up. While hot, it is passed through the slots of the spreader bar.

The cushiony foam-carrying sheets of the present invention can be coated with cohesive-nonadhesive or antistat agents or volatile corrosion inhibitors or any combination of two or three, as described in the parent applications. Particularly desirable antistat-containing formulations are:

EXAMPLE 3

The following materials are mixed in the described order given in parts by weight:

| | |
|---|---|
| Natural rubber latex (62% solids) | 100.0 |
| Colloidal silica in mineral oil (defoamer) | .2 |
| Water | 23.6 |
| KOH Solution (45) solids) in water | 1.1 |
| Nonionic surfactant | .3 |
| Acrylic thickener | 1.3 |
| Water | 18.0 |
| Phenolic antioxidant (50% in Toluene) | 2.1 |
| Acrylic thickener | 1.7 |
| Water | 16.7 |
| Sorbitol solution (70% solids) in water | 3.5 |
| Attapulgite clay | 22.4 |

Just before applying, add the following blend:

| | |
|---|---|
| Polyethylene glycol (400 molecular weight) | 7.1 |
| Polyvinylpyrrolidone | .7 |
| KOH (flake) | .1 |

This composition is preferably applied by roll coating so as to form a coating which after drying weighs about 14 to about 22 grams per square meter. It can also be sprayed on, in which event the thickener and surfactant are not needed. The dried coating is an effective cohesive-nonadhesive layer, and the omission of the sorbitol only slightly reduces its effectiveness. Omitting the clay increases its aggressiveness. The polyvinylpyrrolidone increases its stability. Additional antioxidant can be added to lengthen the shelf life of the dried coating.

EXAMPLE 4

The following volatile corrosion inhibitor coating, in parts by weight, can be used by itself or as an undercoating over which an antistat coating such as that of Example 3 can be applied.

| | |
|---|---|
| Adhesive-type ethylene-vinylacetate copolymer emulsion (55% solids) in water | 100.0 |
| Water | 39.0 |
| 2-amino-2-ethyl-propanediol-1,3 | 30.0 |
| Dicyclohexylamine | 30.0 |
| Benzotriazole (35% in polypropylene glycol having a molecular weight of 400) | 5.0 |
| Nonionic surfactant | .1 |

Coating weights, after drying, are preferably from about 14 to about 22 grams per square meter.

The Example 4 coating can, if desired, also contain cohesive-nonadhesive, as described in the parent applications, Moreover, cohesive-nonadhesive coatings can contain microcapsuled volatile corrosion inhibitors or perfume or insecticide or the like. Such microcapsules are described in U.S. Pat. No. 4,643,764 and in the prior art of record in that patent and are commercially available. When incorporated in an amount of 2% to 5% by weight into the cohesive-nonadhesive will not significantly detract from its cohesiveness.

When a laminate containing such microcapsules is part of a wrapper and is unwrapped, some of the microcapsules rupture, releasing perfume or other ingredients. When used to wrap corrodible metals, handling of a wrapped package will also cause such rupture to release volatile corrosion inhibitor, for example. A strip of such a microencapsulated insecticide-containing sheet can also be used as an animal collar to release insecticide and/or insect repellent whenever rubbed and so help keep insects from bothering the animal.

The microcapsule-containing coating can be applied over a backing sheet such as paper or to the paper or foam face of a paper-foam laminate. Such paper or laminates can be manufactured in long lengths with lines of perforations to make it easier to tear off short lengths and/or widths for any desired use.

These formulations are also very effective when coated on a laminate of ordinary microfoam sheeting about 1½ millimeters thick, laminated to 1/40 millimeter thick polyethylene terephthalate film aluminized on one or both faces. This is illustrated in FIG. 2 where 31 is the polyethylene terephthalate, 33 and 35 are its metallized faces, 37 is the microfoam sheet, and 39 is the cohesive-nonadhesive coating.

Rubber foams, as in Example 1, are particularly desirable when that foam is to be coated with rubber-based cohesive-nonadhesive. Thus, a packaging wrapper laminate of paper or open-faced paperboard laminated to rubber foam sheeting or to rubber foam stripes, coated with a rubber-based cohesive-nonadhesive as described in the parent applications, provides an exceedingly strong cohesive bond when folded into foam-to-foam contact or when pressed into such contact with another such wrapper. In addition, the shelf life of such coated wrappers is longer than that of wrappers in which the foam is not rubber-based. These improvements are due to the chemical identity between the foam polymer and the cohesive-nonadhesive polymer.

It is frequently desirable to use gummed tape to seal packages or to apply to the outside of book bindings, or the like. To this end, it is desirable to have a strong tape, yet an inexpensive one, that does not contain resin film and does not use re-moistening adhesive. This is shown in FIG. 2 which illustrates such tape 20 on an enlarged scale as well as the manner in which it is manufactured. The tape is essentially a pressure-sensitive paper tape having a sheet of paper 22 with one face carrying a layer 24 that does not permit bonding to pressure-sensitive cement for example. Such release papers in which layer 24 is an acrylic release coat of Rhoplex R-225 for example, are readily available commercial products.

The opposing face 36 of sheet 22 is coated with a reinforcement layer 38 of open-weave glass fibers 30 embedded in a pressure-sensitive cement 32. One particularly desirable technique for applying such reenforcing layer is also illustrated in FIG. 2. An inexpensive release sheet 34 such as siliconized paper is first coated with a layer of hot melt pressure-sensitive cement in which is embedded reenforcing filaments, which layer corresponds to 38. A rubber-based pressure-sensitive cement is suitable, as is a diamond-pattern woven glass fiber reenforcement in which the fibers are four mils thick and the diamonds about 5 mm. by 5 mm.

The thus coated release sheet 34 is now rolled against the paper sheet 82 to cause the pressure-sensitive cement 88 to transfer to the face 36 of the paper sheet. The resulting laminate makes a very effective re-enforced sealing tape after pulling off release sheet 34. By slicing the laminate down to two inches or so in width, the resulting narrow tape can be easily used to seal packages made of corrugated paperboard or punched out pieces of such board, or the like. It is very strong yet inexpensive, and it is free of coherent resin film so that it does not complicate the recycling of the packaging. In addition, it does not require moistening so that a sealing operation is very simple to carry out.

Because of the release nature of coating 24, the laminate can be rolled up and unrolled, after sheet 34 is removed, without having the pressure-sensitive layer adhere to the backs of the roll turns. The tape is accordingly very simply used without the complication that would be caused by the presence of sheet 34.

Sheet 22 of 57 pound natural Kraft is strong enough, when reenforced as indicated, for general tape applications, but stronger or weaker papers from about 40 pound to 90 pound can be used. The reenforcement should be such as to bring the breaking strength of the tape to at least about 100 pounds per two inch width, and can use fibers such as nylon in place of the glass.

The reenforcing pattern can be varied, and the fibers can even be without a fixed pattern, as by laterally pressing a cylindrical loosely wound roll of the fibers against the cement 32, or by dropping a stream of loosely cut fibers on the cement.

Sheet 34 can be reused after it is removed from the complete laminate, by recoating it and then using to prepare additional laminate. The release coatings can also be varied to suit circumstances.

Sheet 43 carries the moistenable gum layer 45, a layer which in the interest of economy, can be a simple cooked starch dextrin. Such a coating when dry or wet will not adhere to the tensilized polyethylene, even if that polyethylene is corona treated.

The crossed polyethylene layers 41 contribute considerable tensile strength as well as abrasion resistance to the tape, even when the total thickness of those polyethylene layers is as small as 1.20 millimeter. Thicknesses over about 0.08 millimeter are not helpful.

Again, in the interest of economy, sheet 43 is as thin as convenient—generally not over 1/20 millimeter thick. It can be pre-coated with the gum layer 45 before being laminated to the polyethylene base 41, or it can be top coated after such lamination.

In place of the gum 45, a pressure-sensitive adhesive such as those of Ser. No. 768,103 filed Aug. 21, 1985, now abandoned, can be adhered directly to the cross-tensilized polyethylene backing 41, whether or not the polyethylene surface is corona treated, and without the use of paper sheet 43 or any other intervening sheet. However, such a tape is more expensive to manufacture and needs special attention, such as a covering slip sheet, to keep the pressure-sensitive coating from prematurely adhering to objects which it may contact before it is used.

The very strong support provided by the cross-tensilized polyethylene combination 41 can also be used to support a layer of cushiony foam adhered to the polyethylene through an intervening paper layer in the same manner as in FIG. 3. The exposed foam surface of such a combination can then carry a cohesive-nonadhesive coating and/or an antistat, and/or a volatile corrosion inhibitor, and is a desirable protective wrapping when the foam layer is from about 1/16 millimeter to about three millimeters thick. Here again, the paper layer can be omitted as by using a pressure-sensitive adhesive to laminate the foam directly to the polyethylene.

The wrapper sheets of FIGS. 1 and 2 are desirably used by first forming them into envelopes or pouches, although they can alternatively be used to make packaging sandwiches as described in the parent applications. FIG. 4 shows an envelope 50 made from a laminate of metallized polyethylene terephthalate laminated to a sheet of foam as illustrated in FIG. 2. Two such laminates 52 and 54 are superimposed with the foam layer 56 of sheet 52 engaging foam layer 58 of sheet 54. This superimposed combination then has three of its edges 61, 62 and 63 heat sealed to adhere the sheet edges together. Such heat sealing can be by the techniques described in the parent applications or as in U.S. Pat. No. 4,603,540 by use of heated narrow wheels or discs which are yieldably held edge to edge with the superimposed sheet edges passed between the heated wheel edges so those heated edges engage the metallized polyethylene terephthalate coverings 66 and 68. Because these coverings are as thin as 1/40 millimeter or less, heat from the heated wheel edges readily penetrates through to the foam and heat seals the foam edges together. The heated wheel edges need only be about one to two millimeters wide, the wider edges being suitable for heat sealing along the center line of a wide sandwich of wrapping sheets which can then be cut along the center line of the heat seal to provide two separate heat-sealed edges. Such wider wheel edges can also be fitted with cutting blades centrally located around their rims, so they cut through the sandwich as they heat seal.

Another very effective heat-sealing technique uses an elongated narrow metal bar which can have a knife edge and be heated by an electric current that is passed through it, as in U.S. Pat. No. 4,630,429. After it is heated, it is pushed through the aligned wrapper sheets to be heat-sealed together. This is particularly effective when the foam-backing layer is thermoplastic and thus readily cut through by the hot bar. The bar can be fitted between gripping jaws that secure the aligned wrapper sheets on both sides of the bar and hold them in place during the bar-pushing step. The advancing edge of the hot bar need only be about one to two millimeters wide.

Similar heating can be applied to a cutting bar or knife used to cut through a cold-sealed combination of resin-carrying sheets. Thus, as described in Ser. No. 783,430, filed Oct. 4, 1985, now U.S. Pat. No. 4,693,056 automatic or semi-automatic packaging of relatively small articles can be effected in an elongated sandwich of overlying foam-paper laminates that are fed into foam-to-foam engagement through a sealing apparatus that presses against the side edges of the sandwich. Adhesive or cohesive-nonadhesive coatings on the foam faces are in this way, without the need for heating, cohered to each other around a succession of the individual articles. The elongated assembly is then transversely cut into individual packages by a transversely extending pressing bar and knife combination. Heating that knife to a temperature not high enough to melt the foam helps keep down the accumulation of resin on the knife.

The transverse knife preferably has a serrated cutting edge and can also be heated for similarly making transverse cuts on a folded-over foam-paper laminate for which no side edge sealing is needed, as when preparing a succession of envelope-type packages. If desired, the folded-over packaging can also be effected with one side edge seal that seals the envelopes.

The envelope of FIG. 4 preferably has an antistat coated on or incorporated into the foam layers 56 and 58 to prevent buildup of static electricity when sensitive electronic articles are slipped into or withdrawn from the envelope. Where those articles are also corrodible, the foam preferably also carries a volatile corrosion inhibitor such as those of the parent applications.

While volatile corrosion inhibitors can be mixed with antistats to make an effective coating formulation, they can be applied in separate layers, in which event the volatile corrosion inhibitor layer is applied first and covered with the antistat layer, as described above in connection with Example 4. An example of a single coating formulation is:

EXAMPLE 5

In parts by weight:

| | |
|---|---|
| Adhesive ethylene-vinyl Acetate copolymer emulsion (55% solids) in water | 100.0 |
| Water | 39.0 |
| 2-amino-2-ethyl-propanediol-1,3 | 30.0 |
| Dicyclohexylamine | 30.0 |
| Benzotriazole (35% in Xylene) | 5.0 |
| Nonionic surfactant | .1 |
| Polyethylene glycol (400 molecular weight) | 3.6 |
| Polyvinyl pyrrolidone | .4 |
| KOH (flake) | .1 |

The envelope of FIG. 4 has a flap 70 that projects from one of the sheets 54. When the envelope is used, this flap is preferably folded over the outer face of sheet 52 and can be adhered to that sheet as by stapling or by adhesive such as the cohesive-nonadhesive applied to the inner face of the flap and to the outer portion of sheet 52 engaged by the flap when it is folded over. Gummed tape such as the tape of FIG. 3 can also be used to hold the flap in place. Alternatively the flap can be yieldably held by a heat-seal line near its bight, as in FIG. No. 2 of application Ser. No. 200,671 filed May 31, 1988, now U.S. Pat. No. 4,987,997.

The envelope of FIG. 4 can be made from a single sheet of laminate that is folded at the location of edge 63 to provide the illustrated configuration but requiring only two side sealings, at 61 and 62. A pair of grooved plastic mating strips that interlock can be used instead of a flap, as by heat sealing one mating strip to the inside surface of one wall of the envelope, and the other to the inside surface of the opposite wall.

Polyethylene foam from 1/16 to three millimeters thick makes a very suitable cushiony layer when supported on a polyethylene terephthalate film 1/40 millimeter thick metallized on one or both faces. Such foam can be manufactured with an antistat agent incorporated in it as described in U.S. Pat. No. 4,618,630, and even when not corona-treated will laminate to the polyethylene terephthalate with pressure-sensitive adhesive. The exposed foam face of that laminate can be coated with more antistat agent, or with volatile corrosion inhibitor or with cohesive-nonadhesive, or with combinations of two or all three of them.

Where a laminate has an exposed aluminized surface on polyethylene terephthalate and is to be wound up with that aluminized surface in contact with material having some tack, such as a cohesive-nonadhesive layer, it is preferred to have that aluminizing layer less than about $\frac{1}{2}$ micron thick. Thus, when such a laminate has a cohesive-nonadhesive coating on the face opposite the aluminized surface, coiling the laminate tends to cause l(after a few weeks) some of the aluminum to be lifted from the polyethylene terephthalate by the cohesive-nonadhesive. This so-called blocking tendency is much reduced where the aluminum layer is less than $\frac{1}{2}$ micron thick.

the blocking can also be reduced or completely eliminated by covering the exposed aluminum layer with a slip sheet of siliconized paper, for example, or by applying over the aluminum an electrically conductive or non-conductive protective coating. Such a protective electrically conductive coating is, for example, an electrically conductive resin such as polyacetylene or a resin binder containing electrically conductive fibers or finely divided particles or the like. Graphite fibers about 20 to about 50 microns long are very effective for this purpose, particularly when they are plated with a metal such as nickel. An acrylic resin dissolved in methylethylketone, or dispersed in water, and mixed with a small amount of nickel-coated graphite fibers makes a very effective anti-blocking coating after it is applied to the aluminum and dried to form an adherent protective layer 15 to 20 microns thick. Acrylic binders such as polymethyl methacrylate are preferred for the coating because they make harder coatings. Such electrically conductive coatings can also be used in place of the external aluminized layer.

According to the present invention, heat sealing of backed foam wrappers can also be effected when the foam is not thermoplastic. To this end, an open-cell foam layer can be laminated to a support sheet of paper or the like, using a pressure-sensitive or meltable laminant to secure the foam layer to the support sheet. Typical pressure-sensitive laminants for this purpose are described in application Ser. No. 768,103, filed Aug. 21, 1985, now abandoned. The laminate so made will heat seal to itself foam-to-foam when the sealing heat and pressure liquefies the laminant of one laminate and forces that laminant through the open-celled foam to contact the foam of the laminant to which it is heat sealed. Only one of the laminates need have such a migrating laminant, but better results are obtained when both laminates have it. In the heat sealing, sufficient pressure is used not only to cause the laminant migration, but to also squeeze the cushiony foam layer to a fraction of its normal thickness, so the migrating distance is quite short, as little as $\frac{1}{2}$ to 1 millimeter.

Closed-cell foam layers do not lend themselves to the foregoing migration sealing and should be thermoplastic so as to melt during the heat sealing, as described in application Ser. No. 913,071, filed Sep. 26, 1986, now U.S. Pat. No. 4,774,800; and in parent Ser. No. 783,430, filed Oct. 4, 1985, now U.S. Pat. No. 4,693,056. Complete melting of the foam thicknesses at the foam-to-foam heat-sealing site is preferred inasmuch as this permits the foam-backing sheets (usually paper) to be heat sealed with a melt that contains the original foam-backer laminant, and that melt provides a stronger heat seal than is provided by the melted foam alone.

Some laminants, such as those of the polyamide type and particularly lauryl lactone polymers and co-polymers, provide exceptionally strong bonding adhesion. That strength is such that it provides excellent support backing, as well as adhesion for the foam. Thus, where it has previously been considered desirable to use polyethylene terephthalate films at least 25 microns thick as a backing for a foam layer to make a packaging wrapper, the use of such polyamide laminant to adhere the foam to the backing makes it practical to reduce the polyethylene terephthalate film thickness to as little as 10-12 microns and even to eliminate that backing altogether. The polyamide laminant can then be melted and roll-coated on the face of a closed-cell foam sheet, for example, to add about a 10 to 20 micron layer of the laminant, and the resulting material permitted to cool to provide a flexible well-backed cushiony foam sheet.

The polyamide-type laminants are particularly desirable because they are low-melting and thus can be applied as a hot melt without injuring the foam or whatever backing is used. Laminant melting points below about 120° C. are preferred. These laminants are quite viscous when melted, so that their application by roll coating is a slow one. They can be extruded into thin films which can be applied hot to the foam surface, or stretched to reduce film thickness and then applied and pressed into place by passing such foam-film combination through a nip between rollers. The surface of the roll in contact with the film can be heated and made of polytetrafluoroethylene.

Laminants of the ethylene/acrylic acid co-polymer type or of the thermoplastic block rubber type also provide very high bond strength and are less viscous.

Where a supported foam layer is adhered to an object such as the outside of a package by a pressure-sensitive coating on the foam, the subsequent pulling off of the supported foam from the object generally results in some of the foam tearing off and remaining adhered to the object. This is a particular problem when the foam has a low tensile strength as when it is made of a polyolefin such as polyethylene or polypropylene, or has a high expansion.

This problem can be avoided by laminating to the face of the foam a very thin porous sheet of high-tensile strength. Such laminating is then effected by a coating of pressure-sensitive adhesive that is applied so it penetrates through the pores of the high-tensile sheet. In this way, an ordinary foam-paper wrapper sheet can have its foam face laminated to a 25-micron thick sheet of open spun-bonded polyethylene terephthalate fibers which has been roll-coated with or pulled through a body of liquified pressure-sensitive adhesive. A protective top sheet of silicone-treated paper can then be applied over the spun-bonded sheet and the resulting sandwich subjected to the pressing action of nip rollers to assure that the spun-bonded sheet is securely bonded in place.

Alternatively, the pressure-sensitive coating can be applied directly to the face of the foam or to the silicone-treated face of the protective sheet, so it is squeezed into place in the nip of the rollers.

No protective sheet is needed when the wrapper is dispensed from coils and the outer face of the foam-supporting sheet is siliconized.

The porous sheet should have a tensile strength at least three times and preferably at least five times the tensile strength of the foam. Also, in the interest of economy the porous sheet should be not over about 50 microns thick. Other high-strength fibers such as polyamide fibers or tensilized polyolefin fibers can be substituted for the polyethylene terephthalate fibers of the porous sheet. Spun-bonded polyethylene sheets are described in U.S. Pat. No. 4,644,045.

Instead of spun-bonded sheets, the porous sheets can be screen mesh having mesh openings no larger than about 5 millimeters, but preferably smaller than about 3 millimeters.

The foregoing combinations with porous sheets are less expensive to manufacture than the similar prior art combinations that use non-porous sheets instead. A single pass through a two-roll laminator will apply such a porous sheet and also apply the laminant so it adheres the porous sheet to the foam and also covers the outer surface of the porous sheet.

Another improvement of the present invention is described in connection with FIG. 5 which shows a package 80 in which an electrically sensitive object 82, such as a circuit board is held in an envelope 84 made of a layer 86 of cushiony foam laminated to a polyethylene terephthalate sheet 88 that is metallized on both its faces. The metallizing is preferably about the same on both faces; together they are heavy enough to make the polyethylene terephthalate sheet quite opaque even when that sheet is quite transparent before metallizing.

The thickness of that sheet should not be over about 25 microns, and is preferably no thinner than about 22 microns. The two metallizing layers, generally aluminum, provide particularly effective dual shielding of the package contents against external electrical influences.

The cushiony foam layer can be the microcellular closed-cell polypropylene foam described in U.S. Pat. Nos. 4,086,384 and 4,263,380, but any other cushiony foam of polyethylene, polystyrene, polyvinyl chloride or polyurethane can be used. The thickness of the foam layer is preferably from about 1 to about 7 millimeters. Only 3 millimeters or less are enough for securely packaging light-weight objects such as computer discs of the floppy or rigid types.

The outer face of the foam, which is the face not laminated to the polyethylene terephthalate sheet, preferably carries sufficient antistat to keep from developing a serious static charge build-up when anything is slid over that surface. Any of the antistat agents disclosed in parent Ser. No. 873,819, filed Jun. 13, 1986, now abandoned or in U.S. Pat. Nos. 4,321,297 and 4,584,225 can be used as long as they provide the generally desired short static discharge time—generally about 0.4 second.

The envelope 84 is preferably made by folding a sheet of the laminate along the line 90—90 and adhering the side edges 92, 92 of one fold to the corresponding side edges of the other fold. Such adherence can be effected by heat sealing or cold sealing, along the lines described in parent Ser. Nos. 873,819, filed Jun. 13, 1986, now abandoned and 783,430, filed Aug. 21, 1985, now abandoned or by ultrasonic bonding as also disclosed in Ser. No. 783,430, filed Aug. 21, 1985, now abandoned. Substituting ultrasonic vibrators and anvils for some or all of the melting shoes and supports in the sealing apparatus of Ser. No. 873,819, filed Jun. 13, 1986, now abandoned is particularly desirable.

The folds of the FIG. 5 envelope can alternatively be secured together with ordinary cements or even by stapling. The continuity of the metallized layers from one fold to the other improves their Faraday cage effect in electrically protecting the objects packaged. The outer edges of the seals can be coated with sprayed-on aluminum, or conductive silver paste or the like to also improve the electrical continuity around those edges.

Envelope 84 also has a closure flap 94 which spans the free ends of its folds and thus adds further to the electrical protection. For best protection, that flap can be sealed against the fold it overlies, in any of the various ways described for the side-edge sealing, including heat sealing with heated applicators, or ultrasonic heating, cold sealing with cohesive-nonadhesive cement or pressure-sensitive cement coatings on the underside of the flap, as well as on the fold against which it lies, or even stapling.

Packaging can also be effected by using separate sheets of laminate 84 sandwiched over the top and bottom of the packaged object 82, as described in the parent applications. Those separate laminate sheets can be heat sealed, cold sealed or stapled together around the packaged object.

An electrically conductive foam can be used in place of simple foams. Very finely divided carbon, preferably acetylene black, is readily incorporated in a melted resin like polypropylene before it is foamed, and can yield a foam having an electrical resistance of 1,000 or less ohms per square, even when the foam has an expansion as high as 10. Finely divided metals such as a low-melting tin-zinc alloy having about 60% tin by weight can be used in place of or in combination with the carbon in amounts as high as 35% of the foam. Low-melting metals like the above alloy have melting points near or even below the melting points of the resin into which they are to be incorporated, and can readily be distributed throughout the resin by heating such liquid mixtures. Polyurethane and rubber foam can similarly be made by incorporating finely divided conductive particles in liquid resin precursors or latexes.

With such conductive foams it is still helpful to have at least one metallized coating on the backing for the foam, and plain paper or polyethylene terephthalate can be used where maximum antistat protection is not needed or the foam thickness is greater than 2 millimeters. Antistat coatings are not needed when such conductive foams are used. For cushioning purposes the conductive foam layers, like the non-conductive foam layers, are from about 1 to about 7 millimeters thick, preferably from about 2 to about 4 millimeters thick. Either type of foam can be open-celled or closed-celled. If little or no cushioning is needed, the conductive foam layer can be as thin as 50 microns and can be replaced by as little as 10-micron thick layers of unfoamed conductive resin.

The highly specular nature of the outer metallized surface of the polyethylene terephthalate laminations can be subdued by graining that surface preferably before it is metallized. A mild sandblasting with very fine sharp sand is quite effective, as is the casting of the polyethylene terephthalate sheet against a grained mold surface or the rolling of that sheet between rollers, at least one of which is grained. Such graining of the polyethylene terephthalate sheet helps mask the fingerprints which are normally picked up upon handling the laminate.

Figure 6:
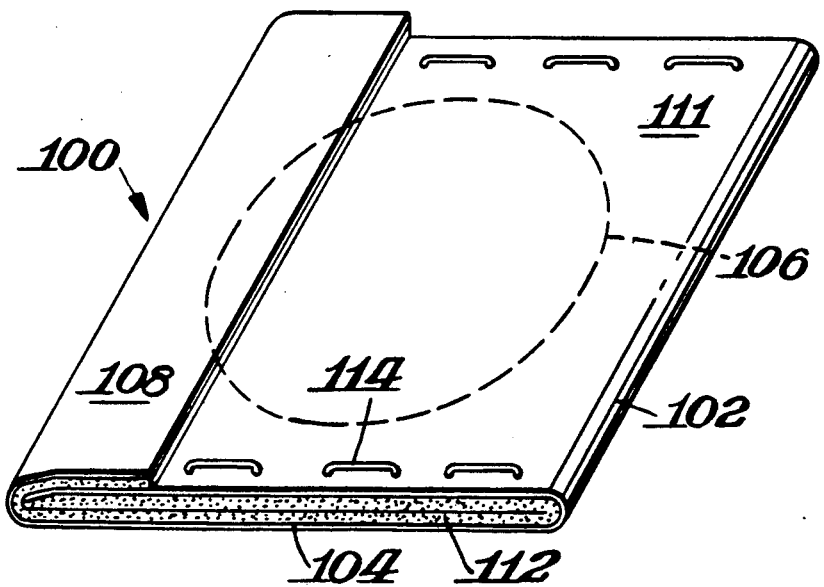

The package 100 of FIG. 6 has an envelope 102 generally similar in shape and construction to the envelope 84 of FIG. 5. Instead of the polyethylene terephthalate backing sheet of FIG. 5, envelope 102 has an iron foil backing sheet 104. That foil is preferably a fairly pure essentially carbon-free annealed iron which has a very high magnetic permeability and a very low remanence. A one-to-three mil thick foil of this type provides good magnetic shielding for the contents of envelope 102, such as a magnetic recording disc 106. A similar foil of iron which contains 1% to 3% silicon is also quite effective.

Metal foil 104 provides sufficient rigidity to stiffen the entire envelope and also enable its flap 108 to remain in place without cementing. Envelope 102 can, accordingly, be used both for shipping its contents, as well as for storing those contents between times when they are intermittently withdrawn for use in a computer or the like. The flap is readily folded open for such withdrawal and re-insertion.

The iron foil can have its external face treated to inhibit corrosion. It can, for example, be coated with aluminum, silver or copper, which provide highly conductive skins that help protect against external electrical influences, or merely coated with a corrosion inhibitor such as partially reduced zincdichromate. The foam layer can also carry volatile corrosion inhibitor that helps protect the foil, particularly its foam-contacting face.

Any metal having a magnetic permeability and remanence approximating those of pure iron provides effective magnetic shielding for the contents of envelope 102.

Envelope 102 can be formed in other ways, as for example, by having its upper fold 111 wider than its lower fold 112 and projecting beyond both side edges of the lower fold. Those projecting margins can then be folded about the edges of the lower fold and engaged against the lower surface of the lower fold 112. Where those folded-over margins are sufficiently stiff, they need not be adhered to the lower surface of fold 112. Alternatively, they can be adhered to that lower surface as by staples 114 as in FIG. 6 or by adhesives or by having the extending margins of upper fold 111 free of foam so those margins can be soldered to the lower surface of fold 112. Where staples are used as in FIG. 6, they are preferably also of pure iron so they magnetically interconnect the foil of the folds at their edges. Adhesives or heat sealing can also be used and heat sealing can be arranged to melt most or all of the foam in the heat-sealing zone to thus shorten the air gap at the fold edges. The outer edges of the heat seals can be painted with a sprayed-on layer of magnetic iron to still further reduce the magnetic gap.

A flap 108 is not needed on the envelope 102 of FIG. 6, particularly if it is only proposed to hold a thin magnetic disc.

The magnetic protection of FIG. 6 is further improved by dividing the foil 104 into two layers that are separated by a non-magnetic gap. Thus, two layers of 0.5-to-1 mil thick iron foil coated on one face with about a 10-micron thick layer of polyethylene or polystyrene or the like can be laminated together with one of the thin coatings between the foils and the resulting assembly laminated to the foam layer. The foam can be cemented to the uncoated face of one of the iron foils so the outer face of the outer foil carries the thin coating as a rust-preventative or the like.

The anti-stat sheets, whether or not they contain foam, can be used as floor mats or the like in so-called "clean rooms" where electronic operations are conducted. Such sheets preferably have a surface that is at least a little resistant to slide when placed on a floor, for example. A thin layer of cushiony foam about 1 millimeter thick provides adequate friction, as does a coating of low-tack pressure-sensitive adhesive, or even a coating of cohesive-nonadhesive. Such coatings can contain anti-stat as noted above and in addition anti-stat can be coated on the opposite face of the sheet or incorporated in the sheet body. A paper sheet is not very rugged and it is preferred to have a sheet of spun-bonded type or of polyethylene film or other wear-resistant plastic. Such a mat placed on a floor will not permit material build-up of static electricity when walked on by people.

Anti-stat sheets, with or without foam can also be used to seal or cover packages containing sensitive material. Thus in the package illustrated in U.S. Pat. No. 4,790,433, the cover foil can be modified so that it is better suited for manufacture as well as handling. To this end the metallized polyethylene terephthalate core of that foil can have a film of polyethylene or polyethylene terephthalate adhered to its metallized surface, and an antistat coating over the film, with another antistat coating on the unmetallized face of the polyethylene terephthalate core. A layer of antistat cohesive-nonadhesive can overlie the latter anti-stat to help the sheet bond to a cohesive-nonadhesive surface layer on the bottom shelf of the '433 package. Suitable antistat cohesive-nonadhesives are disclosed in published PCT application WO 87/01092.

The polyethylene or polyethylene terephthalate layer over the core, protects the metallization and prevents picking of that metallization when the sheet is wound up in roll form. The polyethylene layer over the core can be as much as 62 microns thick, or as little as about 25 microns thick. On the other hand the polyethylene terephthalate layer over the core is preferably from about 12 to about 25 microns thick. The polyethylene terephthalate core is preferably only about 24 microns, although it can be thicker particularly when the cover layer is relatively thin. The metallization is preferably light so as to permit viewing of the packaged material right through the cover sheet.

The cover sheet can also be made easily removable so that the opening of the package is simplified. By way of example a tear tab can be inserted between the cover and the lower portion of the package so as to project from the package and permit a person to lift the cover away.

The wrappers of the present invention are generally marketed as large cylindrical rolls that may be 5 or 6 feet high and be rolled up with about 250 or more feet of wrapper. However, for some purposes, such as wrapping narrow objects, the rolls may be slit down to 12 inches or so each slit-down roll with the 250 feet or more of wrapper. Such slit-down rolls are preferably packed in dispenser type packages for convenient use by the customer.

Obviously many modifications and variations of the present invention are possible in the light of the above teachings. It is, therefore, to be understood that within the scope of the appended claims the invention may be practiced otherwise than as specifically described.

I claim:

1. A paper sealing tape in which the paper is from about 40 to about 90 pound weight, one face of the paper has a slip coating, and the other face carries a layer of pressure-sensitive cement in which is embedded reenforcing fibers to give the tape a breaking strength about 100 or more pounds per two inch width.

2. The combination of claim 1 in which the cement layer is covered by a slip sheet.

* * * * *